US010495744B2

(12) United States Patent
Wallin

(10) Patent No.: US 10,495,744 B2
(45) Date of Patent: Dec. 3, 2019

(54) METHOD, A SYSTEM, A TRANSPONDER, AND A POSITION DETECTION APPARATUS FOR A PRECISE MEASUREMENT OF A POSITION

(71) Applicant: Utvecklingsavdelningen i Sverige AB, Gavle (SE)

(72) Inventor: Kjell Wallin, Gavle (SE)

(73) Assignee: Utvecklingsavdelningen i Sverige AB, Gavle (SE)

( * ) Notice: Subject to any disclaimer, the term of this patent is extended or adjusted under 35 U.S.C. 154(b) by 294 days.

(21) Appl. No.: 15/127,827

(22) PCT Filed: Mar. 31, 2015

(86) PCT No.: PCT/SE2015/050396
§ 371 (c)(1),
(2) Date: Sep. 21, 2016

(87) PCT Pub. No.: WO2015/152809
PCT Pub. Date: Oct. 8, 2015

(65) Prior Publication Data
US 2017/0168154 A1 Jun. 15, 2017

(30) Foreign Application Priority Data

Apr. 1, 2014 (SE) ........................ 1450390

(51) Int. Cl.
*G01S 3/02* (2006.01)
*G01S 13/76* (2006.01)
(Continued)

(52) U.S. Cl.
CPC ............. *G01S 13/767* (2013.01); *G01S 5/14* (2013.01); *G01S 13/84* (2013.01); *G01S 5/02* (2013.01);
(Continued)

(58) Field of Classification Search
CPC ........ G01S 13/767; G01S 13/74; G01S 13/76; G01S 13/785; G01S 13/788; G01S 13/84; G01S 5/14
(Continued)

(56) References Cited

U.S. PATENT DOCUMENTS 4,278,977 A * 7/1981 Nossen ................... G01S 13/79
342/125
4,534,629 A 8/1985 Bogle et al.
(Continued)

FOREIGN PATENT DOCUMENTS

JP 2009-204469 A 9/2009
WO WO 98/27441 A1 6/1998
(Continued)

OTHER PUBLICATIONS

Moustafa Youssef et al., "PinPoint", MOBISYS 2006, International Conference on Mobile Systems, Applications and Services, Uppsala, Sweden, Jun. 19-22, 2006, p. 165-176.
(Continued)

*Primary Examiner* — Chuong P Nguyen
(74) *Attorney, Agent, or Firm* — Renner, Otto, Boisselle & Sklar, LLP

(57) ABSTRACT

The present invention relates to a system for determining a distance, a transponder, a position detection apparatus, and a method therefor. The method for determining a distance comprises providing a position detection apparatus (101), and a transponder (105). The method further comprises generating (201) a pseudo number sequence, transmitting (202) the pseudo number sequence, receiving (203) the pseudo number sequence; modulate (204) the received pseudo number sequence by means of delaying the received pseudo number sequence a predetermined number of clock cycles from a group of at least two predetermined number of
(Continued)

clock cycles. The method further comprises transmitting (205) the modulated pseudo number sequence, receiving (206) the modulated pseudo number sequence, detecting (207) a path time of the pseudo number sequence, by means of delaying and correlating the generated pseudo number sequence with the received modulated pseudo number sequence, wherein the delay time corresponds to the path time, The method further comprises detecting (208) a clock correction factor for the transponder (105) using the received modulated pseudo number sequence, calculating (209) a flight time of the pseudo number sequence between the position detection apparatus and the transponder by means of the path time, the clock correction factor, and the predetermined number of clock cycles of the transponder, and calculating (210) the distance between said position detection apparatus and said transponder by means of the flight time.

12 Claims, 3 Drawing Sheets

(51) Int. Cl.
| | | |
|---|---|---|
| *G01S 13/84* | (2006.01) | |
| *G01S 5/14* | (2006.01) | |
| *G01S 13/78* | (2006.01) | |
| *G01S 5/02* | (2010.01) | |
| *G01S 13/74* | (2006.01) | |

(52) U.S. Cl.
CPC ............... *G01S 13/74* (2013.01); *G01S 13/76* (2013.01); *G01S 13/785* (2013.01); *G01S 13/788* (2013.01)

(58) Field of Classification Search
USPC ........................................................ 342/458
See application file for complete search history.

(56) References Cited

U.S. PATENT DOCUMENTS

| | | | | |
|---|---|---|---|---|
| 6,614,387 | B1* | 9/2003 | Deadman | G01S 13/825 |
| | | | | 340/435 |
| 8,330,648 | B2* | 12/2012 | Park | G01S 13/76 |
| | | | | 342/107 |
| 8,552,903 | B2* | 10/2013 | Julian | H04W 64/00 |
| | | | | 342/118 |
| 8,675,561 | B2* | 3/2014 | Sun | G01S 5/0205 |
| | | | | 370/328 |
| 8,879,407 | B2* | 11/2014 | Ekbal | G01S 13/765 |
| | | | | 342/458 |
| 8,886,125 | B2* | 11/2014 | Agrawal | H04W 76/14 |
| | | | | 455/41.3 |
| 9,215,581 | B2* | 12/2015 | Julian | H04W 64/006 |
| 9,510,383 | B2* | 11/2016 | Agrawal | H04W 76/14 |
| 9,591,470 | B2* | 3/2017 | Julian | H04L 67/24 |
| 2005/0038574 | A1* | 2/2005 | Gila | G01S 13/84 |
| | | | | 701/2 |
| 2007/0285306 | A1* | 12/2007 | Julian | G01S 13/765 |
| | | | | 342/118 |
| 2007/0287386 | A1* | 12/2007 | Agrawal | H04W 76/14 |
| | | | | 455/67.11 |
| 2010/0208231 | A1 | 8/2010 | Murai | |
| 2013/0070607 | A1 | 3/2013 | Sun et al. | |
| 2017/0115373 | A1* | 4/2017 | Lindstrom | G03B 17/38 |

FOREIGN PATENT DOCUMENTS

| | | |
|---|---|---|
| WO | 2007/121488 A1 | 10/2007 |
| WO | WO 2011/009027 A1 | 1/2011 |

OTHER PUBLICATIONS

Yi Jiang et al., "An Asymmetric Double Sided Two-Way Ranging for Crystal Offset", Signals, Systems and Electronics, Jul. 2007, p. 525-528.
European Search Report for corresponding Patent Application No. 15772713.2 dated Oct. 24, 2017.
International Search Report and Written Opinion for corresponding Patent Application No. PCT/SE2015/050396 dated Jul. 29, 2015.

* cited by examiner

METHOD, A SYSTEM, A TRANSPONDER, AND A POSITION DETECTION APPARATUS FOR A PRECISE MEASUREMENT OF A POSITION

This application is a national phase of International Application No. PCT/SE2015/050396 filed Mar. 31, 2015 and published in the English language, which claims priority to Swedish Patent Application No. 1450390-8 filed Apr. 1, 2014, which are hereby incorporated herein by reference in their entirety.

TECHNICAL FIELD

The present invention relates to the field of flight time measurements for a signal between a position detection apparatus and a transponder. More particularly, the present invention relates to a position detection apparatus, a transponder and a method for a precise measurement of a position by means of the flight time for a signal using a novel time-of-arrival method.

BACKGROUND

A precise measurement of a flight time for a radio signal between a first transceiver and a second transceiver is a delicate measurement problem. One way to determine the flight time is to precisely time the interval between sending the signal and receiving the signal. Since this measurement involves two transceivers with two different clocks, a problem to accurately determine the length of this time interval arises.

A solution to this problem is to use a master clock that is transmitted to the transceivers and used to determine the length of the time interval. Another solution disclosed in a scientific publication by Jiang et al. "An assymetric Double Sided Two-Way Ranging for Crystal Offset", Signals, Systems and Electronics, 2007. ISSSE '07. International Symposium on, provides a method to assess the available precision by means of utilizing two transceivers with two crystal based oscillators. This method shows what kind of precision to expect for a measurement.

Yet another solution is disclosed in a conference paper "PinPoint: An Asynchronous Time-Based Location Determination System" by Moustafa Youssef et al. in the conference proceedings of "Mobisys 2006, Uppsala". This solution involves determining a distance between nodes in a network by means of determining a round-trip travel time for a signal between different nodes in a network, wherein each node has a corresponding clock that is not synchronized.

SUMMARY

An object of the present invention is to provide a method and a transceiver that at least partly obviates some of the problems and disadvantages outlined in connection with known methods and transceivers.

In accordance with an embodiment of the present invention a method is provided comprising providing a position detection apparatus. The position detection apparatus comprises a first processing means, a first transmitting means, and a first receiving means. The method further comprises providing a transponder. The transponder comprising a second processing means, a second receiving means, and a second transmitting means. The method further comprises generating a pseudo number sequence by means of the first processing means, transmitting the pseudo number sequence by means of the first transmitting means, receiving the pseudo number sequence by means of the second receiving means; modulate the received pseudo number sequence by means of delaying the received pseudo number sequence a predetermined number of clock cycles from a group of at least two predetermined number of clock cycles, by means of the second processing means; transmitting the modulated pseudo number sequence by means of the second transmitting means; receiving the modulated pseudo number sequence by means of the first receiving means; detecting a path time of the pseudo number sequence, by means of delaying and correlating the generated pseudo number sequence with the received modulated pseudo number sequence, wherein the delay time corresponds to the path time, by means of the first processing means; detecting a clock correction factor for the transponder using the received modulated pseudo number sequence, by means of the first processing means; calculating a flight time of the pseudo number sequence between the position detection apparatus and the transponder by means of the path time, the clock correction factor, and the predetermined number of clock cycles of the transponder, by means of the first processing means; calculating the distance between said position detection apparatus and said transponder by means of the flight time, by means of the first processing means.

In accordance with another embodiment of the present invention, a system is provided. The system comprises a position detection apparatus. The position detection apparatus comprises a first transmitting means, a first receiving means, and a first processing means. The first processing means comprises means for generating a pseudo number sequence, means for decoding the modulated pseudo number sequence, means for detecting a path time of the pseudo number sequence, by means of delaying and correlating the generated pseudo number sequence with the received modulated pseudo number sequence, wherein the delay time corresponds to the path time, means for detecting a clock correction factor of the transponder by means of the predetermined delay time of the received modulated pseudo number sequence, means for calculating a flight time of the pseudo number sequence between the position detection apparatus and a transponder by means of the path time, the clock correction factor, and the predetermined delay time of the transponder, means for calculating the distance between said position detection apparatus and said transponder by means of the flight time. The system further comprises a transponder. The transponder comprising a second receiving means, a second transmitting means, a second processing means. The second processing means comprises means for receiving the pseudo number sequence, means for modulation of the received pseudo number sequence forming the modulated pseudo number sequence, wherein said means for modulation is adapted to modulate the received pseudo number sequence by means of delaying the received pseudo number sequence a predetermined delay time from a group of at least two predetermined delay times, means for sending the modulated pseudo number sequence.

In accordance with another embodiment of the present invention, a transponder is provided. The transponder comprises means for receiving the pseudo number sequence; means for modulating the received pseudo number sequence forming the modulated pseudo number sequence, wherein said means for modulating is adapted to modulate the received pseudo number sequence by means of delaying the received pseudo number sequence a predetermined delay time from a group of at least two predetermined delay times; means for sending the modulated pseudo number sequence.

In accordance with another embodiment of the present invention, a position detection apparatus is provided. The position detection apparatus comprises a first transmitting means, a first receiving means, and a first processing means. The first processing means comprises means for detecting a path time of the pseudo number sequence, by means of delaying and correlating the generated pseudo number sequence with the received modulated pseudo number sequence, wherein the delay time corresponds to the path time. The first processing means further comprises means for detecting a clock correction factor of the transponder by means of the predetermined delay time of the received modulated pseudo number sequence. The first processing means further comprises means for calculating a flight time of the pseudo number sequence between the position detection apparatus and the transponder by means of the path time, the clock correction factor, and the predetermined delay time of the transponder. The first processing means further comprises means for calculating the distance between said position detection apparatus and said transponder by means of the flight time.

An advantage of particular embodiments of the present invention is that a precise measurement of the flight time for a signal between a position detection apparatus and a transponder can be obtained.

An advantage of particular embodiments of the present invention is that a precise measurement of the distance between a position detection apparatus and a transponder can be obtained.

An advantage of particular embodiements of the present invention is that external syncronization of the position detection apparatus and a transponder used to determine the flight time becomes unnecessary.

Yet another advantage of some embodiments is that the clock circuit of a transceiver according to the present invention may be based on crystal oscillators, that are cheap and reliable.

DETAILED DESCRIPTION OF EMBODIMENTS

In the following, different aspects will be described in more detail with reference to certain embodiments and to accompanying drawings. For purpose of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a first and a second processing means, they may also be embodied in a microprocessor or in a field programmable gate array (FPGA) having a memory, wherein the memory is encoded with one or more programs that may perform the method disclosed herein.

As will be described in detail below, the present invention has devised a way to precisely determine a distance between a position detection apparatus and a transponder by means of measuring a flight time of a signal between the position detection apparatus and the transponder.

An embodiment of the invention will now be described with reference made to FIG. 1.

Figure 1:
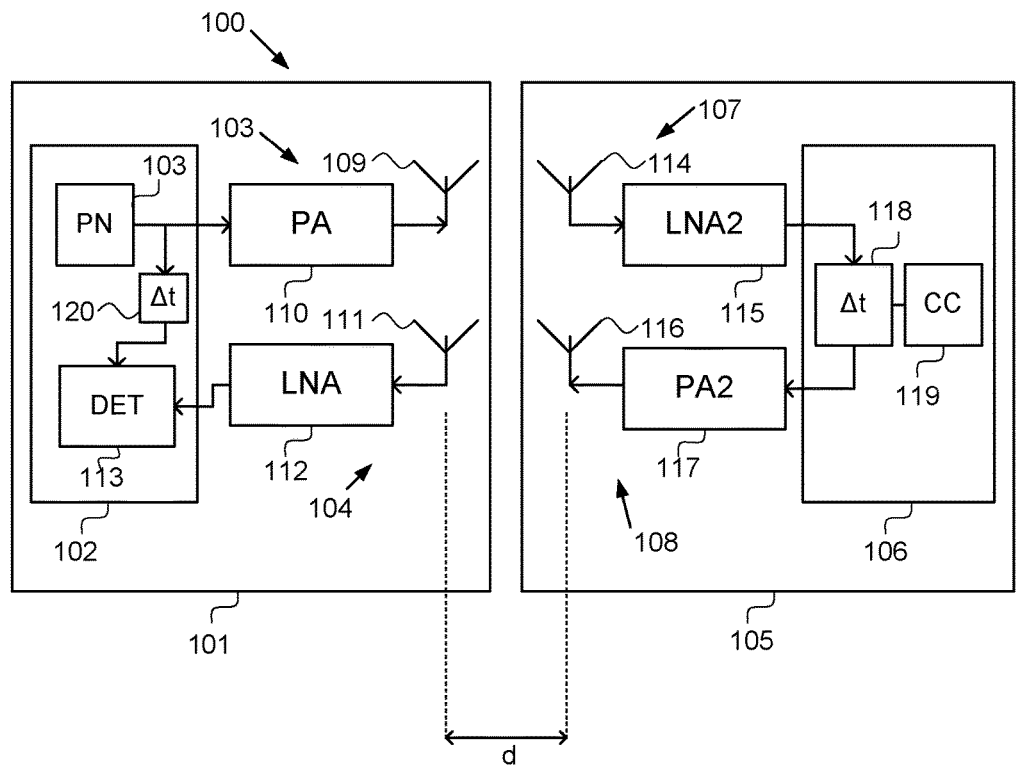
FIG. 1 is an illustration of a position detection system according to the invention for determining a distance.

An embodiment of a position detection apparatus (PDA) 101 is illustrustrated to the left in FIG. 1. The PDA 101 comprises a first transmitting means 103 having a first transmitting antenna 109 connected to a first power amplifier (PA) 110. The PDA 101 further comprises a first receiving means 104 having a first receiving antenna 111 connected to a low noise amplifier (LNA) 112. The output of the LNA 112 is connected to a first processing means 102.

The first processing means 102 further comprises a pseudo number generator (PN) 103 provided to generate a PN sequence of a predetermined length. This pseudo number generator may in one embodiment generate a pseudo random binary sequence (PRBS) but other sequences may be generated in other embodiments, such as Gold code for example. The generated PN sequence is relayed from the first processing means 102 to the PA 110 of the first transmitting means 103, and to a detection means 113 of the first processing means 102.

Furthermore, to the right in FIG. 1 is an embodiment of a transponder 105 disclosed. The transponder 105 comprises a second receiving means 107 having a second receiving antenna 114 connected to a second low noise amplifier (LNA2) 115. The transponder 105 further comprises a second transmitting means 108 having a second transmitting antenna 116 connected to a second power amplifier (PA2) 117. The transponder 105 further comprises a second processing means 106 being connected to the PA2 and to the LNA2.

The second processing means 106 comprises a delay circuit 118 with the input thereof connected to the output of the LNA2, the delayed output from the delay circuit 118 is connected to the PA2. The amount of delay is controlled by means of a control circuit (CC) 100.

Figure 2:
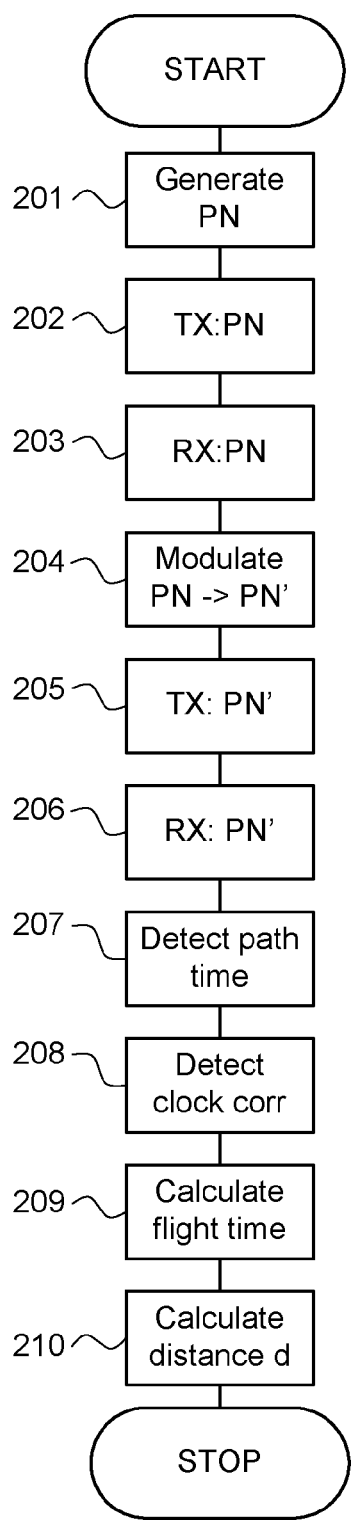
FIG. 2 is a flowchart illustrating an embodiment of a method according to the invention.

The operation of the embodiment of a system according to FIG. 1 will now be disclosed with reference made to FIG. 2 illustrating an embodiment of the inventive method.

201: A pseudo number sequence (PN-sequence) of a PRBS type is generated by means of the PN 103 of the first processing means. In one embodiment, the length of the sequence is 32767 bits before the sequence repeat it self.

202: Transmitting the pseudo number sequence by means of the first transmitting means (103). The PN-sequence is relayed from the PN 103 to the first transmitting antenna 109 via PA 110. The PN-sequence travels with the speed of light and reaches the transponder 102 after travelling a distance d.

203: The transponder 102 receives the PN sequence by means of the second receiving means (107). The received PN-sequence is amplified by LNA2 115 before being relayed to the second processing means 106.

204: The received PN-sequence is modulated by means of delaying the received pseudo number sequence a predetermined number of clock cycles from a group of at least two predetermined number of clock cycles, by means of the second processing means 106. This modulation will be described in more detail in the following.

Figure 3:
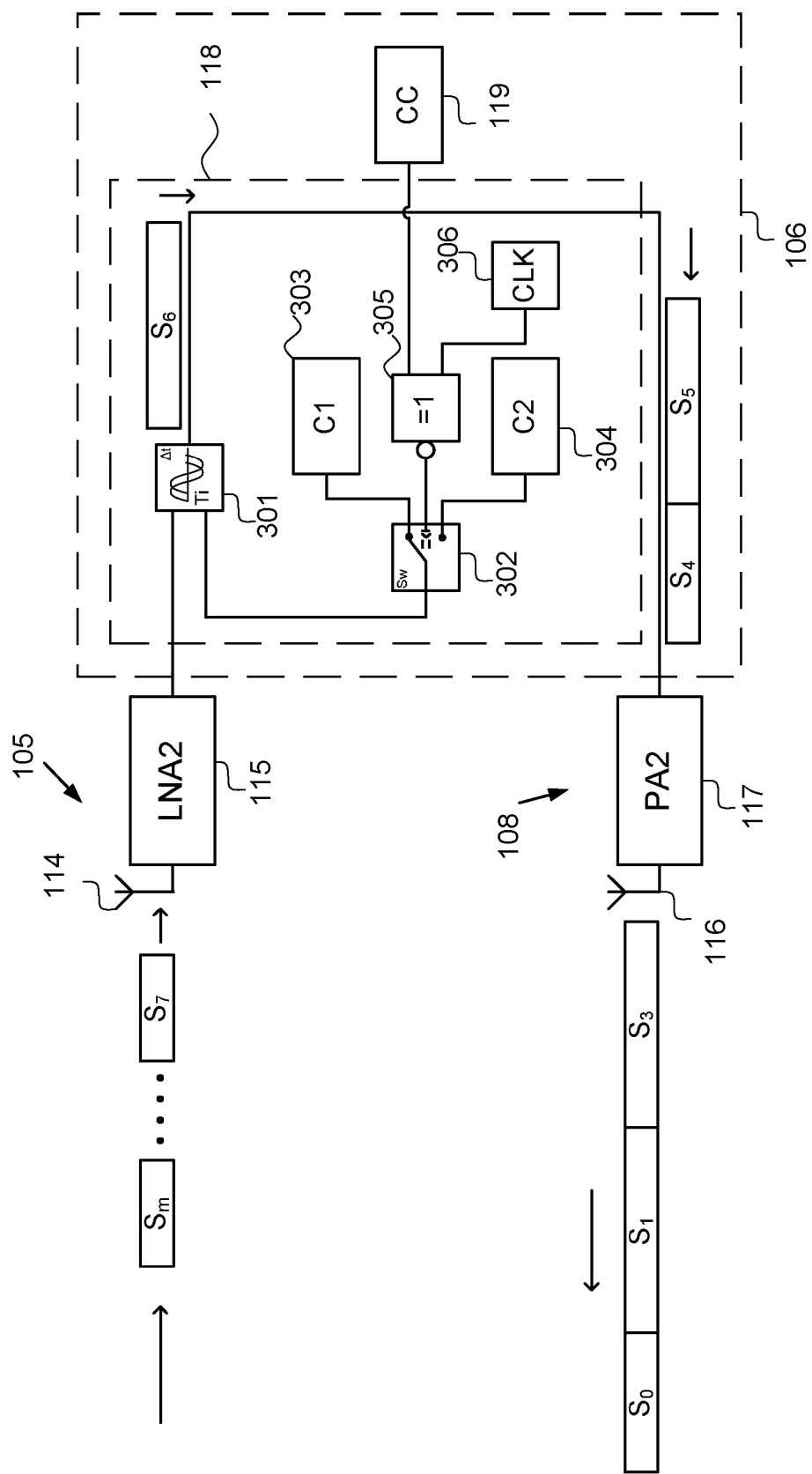
FIG. 3 is a schematic drawing illustrating an embodiment of a transponder according to the invention.

In order to describe the modulation of the PN-sequence reference is now made to FIG. 3. In FIG. 3 is a number of PN-sequences $S_0$-$S_m$ illustrated. The length of each of these PN-sequences is in reality much longer than the length illustrated in this embodiment. The PN-sequence is received by means of the second receiving antenna 114 and amplified by LNA2. In one embodiement is the received PN-sequence converted to a digital signal by means of an analogue to digital converter of the second processing means 106. The received PN-sequence is relayed to a variable delay circuit 301. The output from this variable delay circuit 301 is relayed to the PA2 117 and transmitted by means of the second transmitting antenna. The modulation of the received PN-sequence is performed by the variable delay circuit 301. The amount of delay is controlled by means of a switching element 302, that in this embodiment selects the amount of delay from two predetermined delay values C1 303 or C2 304, given as a number of clock cycles of the transponder 105. The switching of the switching element 302 is controlled by means of an output from an exclusive NOR circuit (XNOR) 305. The input signals to the XNOR 305 is a sequence clock signal from a sequence clock 306 and a data signal from a control circuit 119.

In one embodiment is the frequency of the sequence clock 306 selected such that a full PN-sequence of for example 32767 bits is transferred during a half clock period of the sequence clock 306.

The data signal from the control circuit 119 relays a bitstream that in one embodiment has a frequency of half the clock frequency of the sequence clock 306.

Both the bitstream frequency and the frequency of the sequence clock 306 is a multiple of the clock frequency of the second processing means 106.

By introducing the delay values of the variable delay circuit 301 to the stream of PN-sequences the data signal can be transferred by means of the PN-sequences. Each bit from the datastream can in one embodiment be transferred by means of two PN-sequences by means of a differential modulation.

Now with reference made to FIG. 2 again, the embodiment of the method further comprises.

205: Transmitting the modulated pseudo number sequence by means of the second transmitting means 108.

206: Recieving the modulated pseudo number sequence by means of the first receiving means 104. In one embodiment comprises the first receiving means 104 an analogue to digital converter, whereby the received modulated pseudo number sequence is digitized.

207: Detecting a travel time of the pseudo number sequence, by means of delaying and correlating the generated pseudo number sequence with the received modulated pseudo number sequence, wherein the delay time corresponds to the travel time, by means of the first processing means 102. The generated PN-sequence is relayed to a detector 113 and stored in a register via a delay means 120. The received modulated PN-sequence is also relayed to the detector 113. By means of adjusting the delay time of the delay means 120 and correlating the received modulated PN-sequence with the delayed generated PN-sequence a correlation signal can be obtained. Upon detection of a maximum value of the correlation signal, the corresponding adjusted delay time of the delay means 120 corresponds to the round trip travel time for the PN sequence.

208: Detecting a clock correction factor for the transponder 105 using the received modulated pseudo number sequence, by means of the first processing means 102. The clock correction factor is detected by means of triggering a counter of the first processing means upon detection of a correlation signal maximum. The counter counts the number of clock pulses for the first processing means 102 between two correlation signal maximum. The first processing means 102 comprises information about the predetermined delays C1 301 and C2 302. Hence, by using the counted number of clock pulses in the first processing means 102 and the information about the predetermined delays C1 and C2 in the second processing means 118, the first processing means 102 is capable of calculating a clock correction factor that can be used to adjust the predetermined delays C1 and C2 of the second processing means 118 to corresponding delays measured by means of the first processing means 102. Hereby, a clock correction factor is provided that can be used to translate times measured by means of the second processing means to times measured by means of the first processing means 102.

209: Calculating a flight time of the pseudo number sequence between the position detection apparatus and the transponder by means of the path time, the clock correction factor, and the predetermined number of clock cycles of the transponder, by means of the first processing means 102;

210: Calculating the distance between said position detection apparatus and said transponder by means of the flight time, by means of the first processing means 102.

In one embodiment, the first receiving antenna 111 and the second receiving antenna 114 are broadband antennas.

In yet another preferred embodiment is the first processing means 102 a field programmable gate array (FPGA).

In yet another embodiment, the first processing means 102 and the second processing means 106 comprises analogue to digital converters.

In yet another embodiment is the system configured for impulse radio.

In the above disclosed embodiment is a baseband modulated solution disclosed but for the person skilled in the art it is a small effort to introduce mixers etc to provide a solution at a desired frequency.

The invention claimed is:

1. A method comprising:
generating, by a first processor of a position detection apparatus, a pseudo number sequence;
transmitting, by a first transmitting antenna of the position detection apparatus, the pseudo number sequence;
receiving, by a second receiving antenna of a transponder, the pseudo number sequence;
modulating, by a second processor of the transponder, the received pseudo number sequence by a delay circuit, wherein the delay circuit is configured to delay the received pseudo number sequence a predetermined number of clock cycles from a group of at least two predetermined number of clock cycles;
transmitting, by a second transmitting antenna of the transponder, the modulated pseudo number sequence;
receiving, by a first receiving antenna of the position detection apparatus, the modulated pseudo number sequence;
detecting, by the first processor, a path time of the pseudo number sequence, wherein the first processor is configured to delay, by a delay time, the generated pseudo number sequence and correlate the generated pseudo number sequence with the received modulated pseudo number sequence, wherein the delay time corresponds to the path time;
detecting, by the first processor, a clock correction factor for the transponder using the received modulated pseudo number sequence;
calculating, by the first processor, a flight time of the pseudo number sequence between the position detection apparatus and the transponder using the path time, the clock correction factor, and the predetermined number of clock cycles of the transponder;
calculating, by the first processor, a distance between said position detection apparatus and said transponder using the flight time.

2. The method according to claim 1, wherein modulating the received pseudo number sequence further comprises differential modulation using the at least two predetermined number of clock cycles in such a way that information from the transponder is encoded within the modulated pseudo number sequence.

3. The method according to claim 2, wherein detecting of the clock correction factor further comprises:
decoding the information from the transponder by decoding a time delay of the modulated pseudo number sequence.

4. The method according to claim 1, wherein the generated pseudo number sequence is a pseudo random binary sequence.

5. A system comprising:
a position detection apparatus, comprising:
a first transmitting antenna;
a first receiving antenna;
a first processor, comprising:
a pseudo number generator for generating a pseudo number sequence;
a detector for decoding a received modulated pseudo number sequence;
wherein the first processor is configured to detect a path time of the pseudo number sequence, by delaying, by a delay time, the generated pseudo number sequence and correlating the generated pseudo number sequence with the received modulated pseudo number sequence, wherein the delay time corresponds to the path time;
wherein the first processor is configured to detect a clock correction factor of a transponder using a predetermined delay time of the received modulated pseudo number sequence;
wherein the first processor is configured to calculate a flight time of the pseudo number sequence between the position detection apparatus and a transponder using the path time, the clock correction factor, and the predetermined delay time of the transponder;
wherein the first processor is configured to calculate a distance between said position detection apparatus and said transponder based on the flight time;
the transponder comprising:
a second receiving antenna for reception of a received pseudo number sequence;
a second transmitting antenna; and
a second processor, comprising:
a variable delay circuit coupled to the second receiving antenna for modulation of the received pseudo number sequence to form a modulated pseudo number sequence, wherein said variable delay circuit for modulation is adapted to modulate the received pseudo number sequence by delaying the received pseudo number sequence a predetermined delay time from a group of at least two predetermined delay times;
wherein the variable delay circuit of the second processor is coupled to the second transmitting antenna for sending the modulated pseudo number sequence.

6. The system according to claim 5, wherein the second processor is further configured for a differential modulation using the at least two predetermined delay times in such a way that an identifier of the transponder is encoded within the modulated pseudo number sequence.

7. The system according to claim 5, wherein the first processor is further configured for decoding an identity of the transponder by means of decoding timing of the received modulated pseudo number sequence.

8. The system according to claim 5, wherein the pseudo number sequence is a pseudo random binary sequence.

9. A position detection apparatus, comprising:
a first transmitting antenna;
a first receiving antenna;
a first processor, comprising:
one or more programs configured to detect a path time of a pseudo number sequence, by delaying and correlating a generated pseudo number sequence with a received modulated pseudo number sequence, wherein the delay time corresponds to the path time;
wherein the one or more programs are further configured to detect a clock correction factor of a transponder using a predetermined delay time of the received modulated pseudo number sequence;
wherein the one or more programs are further configured to calculate a flight time of the pseudo number sequence between the position detection apparatus and the transponder using the path time, the clock correction factor, and the predetermined delay time of the transponder;
wherein the one or more programs are further configured to calculate a distance between said position detection apparatus and said transponder using the flight time.

10. The position detection apparatus according to claim 9, wherein the one or more programs are further configured to decode the identity of the transponder by decoding timing of the received modulated pseudo number sequence.

11. The position detection apparatus according to claim 9, wherein the pseudo number sequence is a pseudo random binary sequence.

12. A transponder comprising:
a receiving antenna for receiving a pseudo number sequence;
a processor for modulating the received pseudo number sequence and forming a modulated pseudo number sequence, wherein said processor for modulating is adapted to modulate the received pseudo number sequence by delaying the received pseudo number sequence a predetermined delay time from a group of at least two predetermined delay times; and
a transmitting antenna for sending the modulated pseudo number sequence; and
wherein the processor for modulating the received pseudo number sequence includes a variable delay circuit configured for a differential modulation using the at least two predetermined delay times in such a way that an identifier of the transponder is encoded within the modulated pseudo number sequence.

* * * * *